United States Patent [19]

Birkert et al.

[11] Patent Number: 4,878,423
[45] Date of Patent: Nov. 7, 1989

[54] ELECTRIC TOASTER

[75] Inventors: Karl Birkert, Steinbach; Heinz Marburger, Frankfurt am Main, both of Fed. Rep. of Germany

[73] Assignee: Rowenta-Werke GmbH, Offenbach am Main, Fed. Rep. of Germany

[21] Appl. No.: 179,562

[22] Filed: Apr. 8, 1988

[30] Foreign Application Priority Data

Apr. 8, 1987 [DE] Fed. Rep. of Germany ....... 3711786

[51] Int. Cl.⁴ .............................................. A47J 37/08
[52] U.S. Cl. ........................................ 99/332; 99/391; 99/393
[58] Field of Search ............................ 99/325, 326–328, 99/331–333, 329 R, 329 P, 391, 337, 385, 389, 393–396, 399, 402, 341, 427, 401

[56] References Cited

U.S. PATENT DOCUMENTS

| | | | |
|---|---|---|---|
| 2,389,927 | 11/1945 | Parr | 99/391 |
| 3,438,318 | 4/1969 | Williams | 99/391 X |
| 3,752,955 | 8/1973 | Grove | 99/389 X |
| 3,760,139 | 9/1973 | Sato | 99/393 X |
| 4,397,227 | 8/1983 | Landry | 99/391 X |
| 4,404,899 | 9/1983 | Weiss | 99/391 X |
| 4,590,849 | 5/1986 | Uemura et al. | 99/331 |

FOREIGN PATENT DOCUMENTS 1753124 4/1972 Fed. Rep. of Germany .
2014024 11/1978 Fed. Rep. of Germany .

Primary Examiner—Timothy F. Simone
Attorney, Agent, or Firm—Toren, McGeady & Associates

[57] ABSTRACT

The invention relates to an electric toaster with toasting time control by means of a timer and a lifting device for the bread carrier. The lifting device consists of at least one spring having the so-called memory effect and operatively connected to the bread carrier.

4 Claims, 4 Drawing Sheets

ELECTRIC TOASTER

BACKGROUND OF THE INVENTION

The invention relates to an electric toaster with toasting time control by means of a timer and a bread carrier which is movable by means of a lifting device between a toasting position and a toast removal position.

Electric toasters which eject the bread upwardly are provided with vertically movable and vertically guided bread carriers which are lowered into the operating position by hand, thereby simultaneously switching on the heating current. After the toasting operation has ended, the bread carrier is released under the control of a timer and a return spring abruptly raises the toast from the bottom position to the top position. In this position, the toast can be taken out.

In order to reduce the noise which accompanies the movement of the bread and to prevent the bread from being ejected out of the toaster when the bread carrier is raised, it has already been provided that a bread carrier be provided with a damping device. Thus, a toaster is known (German Patent No. 20 14 024) in which the upward movement of the bread carrier is delayed by a flywheel. This additional damping device not only necessitates more individual parts for the lifting device but also unnecessarily increases the manufacturing costs.

A construction is also known in which the bread carrier is vertically movable by means of electric resistance wires which change length when heated (German Offenlegungsschrift No. 17 53 124). However, the necessary lifting movement of the bread carrier can only be achieved in this appliance by means of considerable gearing. The technical effort involved and the limited service life of the resistance wires, which may be subjected to very considerable mechanical stress particularly in the cold state, are major disadvantages of this toaster.

SUMMARY OF THE INVENTION

The aim of the invention is to provide an electrically heated toaster in which the lifting movements of the bread carrier occur automatically and continuously, no additional damping devices are needed to limit the lifting speed and the technical effort required for the lifting mechanics is exceptionally small.

This aim is achieved with the characterising features of claim 1.

The lifting device according to the invention avoids the known abrupt raising of the bread carrier when the toasting operation has ended. This is achieved by the spring which has a so called memory effect. These known springs have temperature-dependent form-changing characteristics, a distinction being made between one-way and two-way effects. Both types of spring may be used in the lifting device according to the invention. The spring is heated either directly or indirectly. When heated directly, the spring is provided with electrical connections and forms a resistance in a separate heating circuit which is controlled by means of the timer for the toasting time. When the spring is heated in this way, no additional heating for the spring is required.

When the timer is switched on for the desired toasting time, the heating of the spring is also switched on and the spring is heated up. The effects of heat cause the spatial shape of the spring to change. Since the spring is operatively connected to the bread carrier, it is automatically and continuously drawn into the toasting area of the toaster, in the case of a spring with a two-way effect. When toasting is finished, the heating of the spring is switched off by means of the timer and the spring cools down. The spring returns to its original shape and the bread carrier moves back into its original position. Since the lifting movements of the bread carrier take place automatically and continuously, there is no need for any additional damping devices to restrict the lifting speed. For reasons of cost, it is advisable to use a metal memory spring with one-way effect, the return movement of the bread carrier being brought about by a conventional energy store or a second spring made of memory metal with a one-way effect. The memory spring is advantageously connected to the toaster and to the bread carrier, whilst the energy store or the second memory spring is clamped with one end in the toaster and with its other end secured to a flexible connecting element, e.g. a cable, a steel strip or the like which is secured to the bread carrier and guided over a guide roller rotatably mounted in the toaster. In this way, the mechanical stresses on the connecting element are reduced and its service life is increased. The guide roller is advantageously constructed as a cam disc. If a conventional tension spring is used as the energy store with a linear-elastic characteristic, the lever arm at the operative end of the spring force of the return spring may be changed in inverse proportion to the spring force and in this way the torque of the return spring may be kept constant, analogously to the torque of the memory spring. In this way, the normally increasing force of the return spring is compensated so that the lifting effort of the memory spring largely corresponds to the effort required to move the bread carrier.

Embodiments by way of example of the invention are shown in the drawings and described more fully hereinafter.

DETAILED DESCRIPTION OF THE PREFERRED EMBODIMENTS

Figure 1:
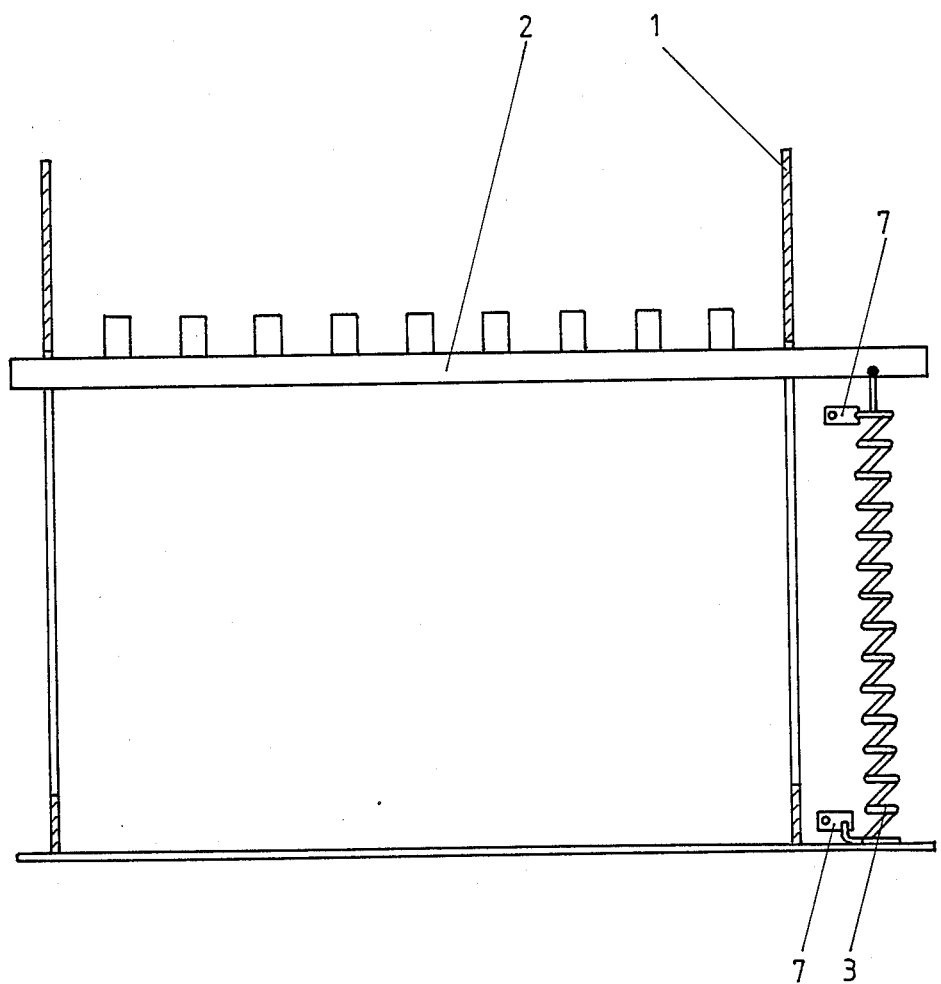
FIG. 1 diagrammatically shows the lifting device according to the invention for a toaster.
Figure 2:
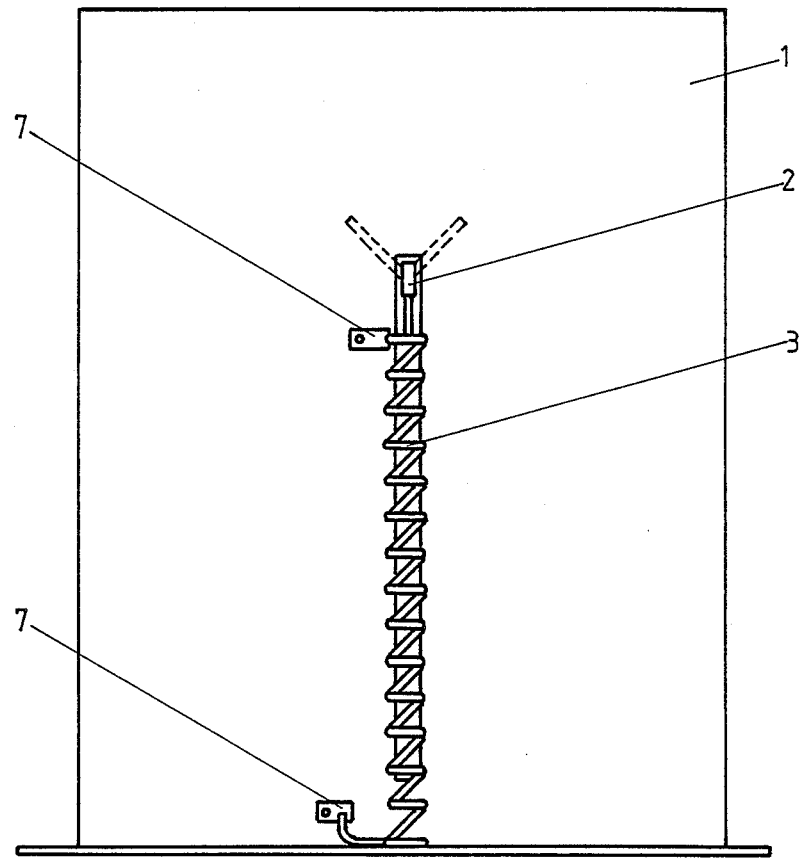
FIG. 2 shows the lifting device according to FIG. 1 in side view.

FIGS. 1 and 2 diagrammatically show a toaster in which a bread carrier 2 is guided in vertically movable manner. The lifting device for the bread carrier 2 consists of a spring 3 which has temperature-dependent shape changing characteristics, the so-called memory effect. The spring 3 is secured at one end to the toaster 1 and at the other end to the bread carrier 2. The spring 3 is a two-way spring the shape changing characteristics of which are reversible. The spring 3 is provided with electrical connections 7 and is directly heated when the heating current is switched on. The heating current is switched on by means of the timer shown for the desired toasting time. As a result of the effect of the heat the spring 3 contracts and pulls the bread carrier 2 together with the bread which is to be toasted continuously into the toasting area. After the toasting operation has ended, the timer switches off the heating current for the spring 3. The spring 3 cools down, moving continuously back into its original shape and returning the bread carrier to its original position.

Figure 3:
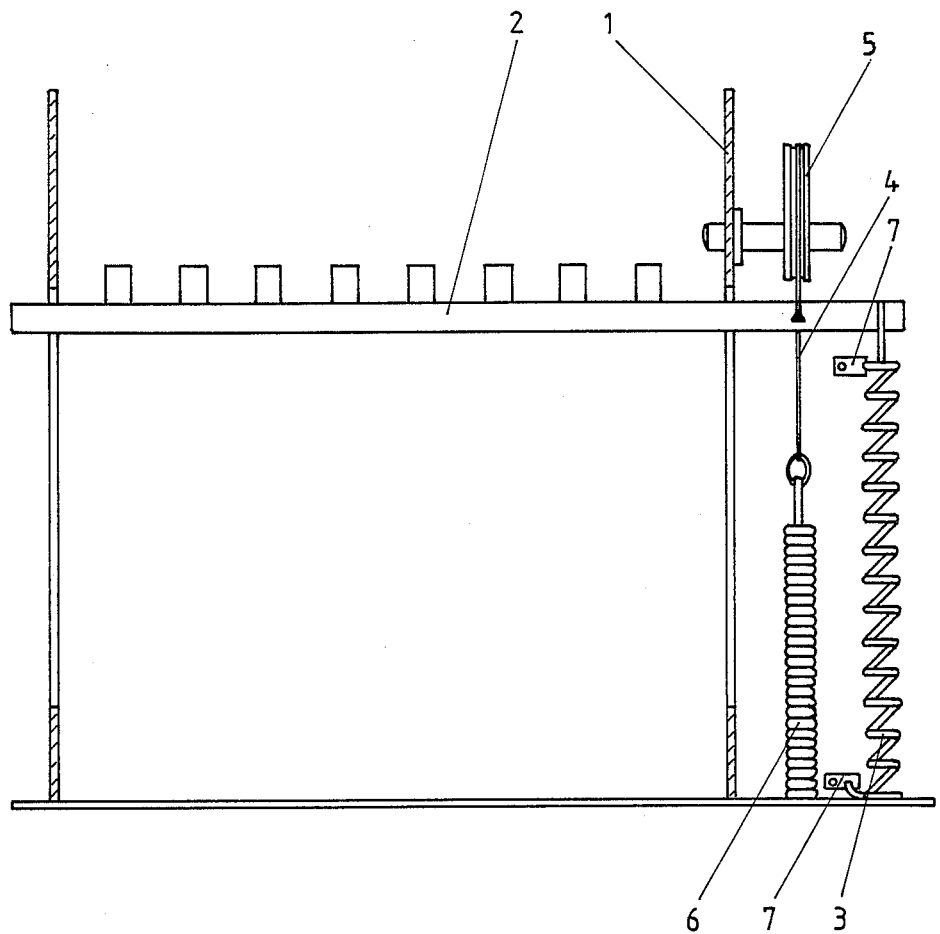
FIG. 3 shows another embodiment.

In the embodiment shown in FIG. 3, the memory spring 3 has a one-way effect and the bread carrier 2 is returned to its original position by means of an energy store 6 in the form of a tension spring. The tension spring 6 is fixed with one end in the toaster 1 and connected at its other end to a cable 4. The cable 4 is guided over a guide roller 5 and fixed to the bread carrier 2. The guide roller 5 is rotatably mounted in the toaster 1. The spring 3 which is directly heated via a timer contracts continuously when heated up and pulls the bread carrier 2 into the toasting area together with the bread to be toasted, counter to the tensile force of the spring 6. When the toasting operation has ended, the timer switches off the heating current for the spring 3 as well and the spring 3 cools down. During the cooling process the spring 3 is continuously returned to its original shape by means of the biassed tension spring 6 and consequently the bread carrier 2 which is operatively connected to the spring 6 is also returned to its original position.

Figure 4:
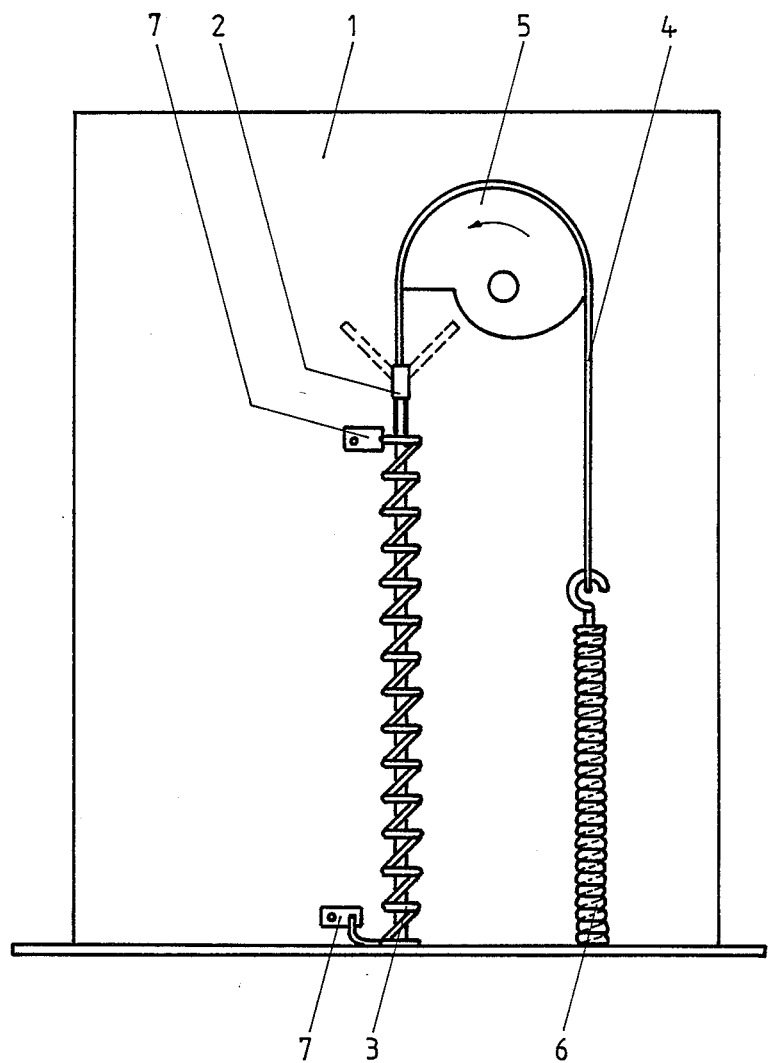
FIG. 4 shows another embodiment.

FIG. 4 shows another embodiment in which the guide roller 5 is constructed as a cam disc. The mode of operation of the lifting device shown corresponds to that of the embodiment shown in FIG. 3. When there is a tension spring 6 with a linear-elastic characteristic as the energy store, the lever arm at the operative end of the spring 6 can be changed in inverse proportion to the spring force by means of the cam disc and in this way the torque of the spring 6 can be kept constant analogously to the torque of the spring 3. In this way, the normally increasing force of the energy store 6 is compensated so that the lifting effort of the spring 3 substantially corresponds to the effort involved in moving the bread carrier 2.

We claim:

1. An electrical toaster, comprising:
   timer means for controlling toasting time;
   a movable bread carrier; and
   lifting means for moving the bread carrier between a toasting position and toast removal position, the lifting means including at least one spring having temperature-dependent form changing characteristics, the at least one spring being operatively connected to the bread carrier so as to move the bread carrier between the toasting and toast removal positions in response to a temperature change.

2. An electric toaster as defined in claim 1, wherein the lifting means further includes an energy store having a first end secured to the toaster and a second end, a flexible connecting element having one end connected to the second end of the energy store and another end arranged so as to act on the bread carrier, and a rotatably mounted guide roller provided so as to guide the flexible connecting element, the at least one spring and the energy store having pulling directions which are substantially equal.

3. An electric toaster as defined in claim 2, wherein the guide roller is a cam disc.

4. An electric toaster as defined in claim 1, wherein the lifting means includes two springs having temperature-dependent form changing characteristics which act opposite one another, the springs being connected to the bread carrier so that one spring acts to move the bread carrier to the toasting position and the other spring acts to move the bread carrier to the toast removal position.

* * * * *